United States Patent [19]

Saalbach et al.

[11] Patent Number: 4,709,551
[45] Date of Patent: Dec. 1, 1987

[54] PRESSURE CYLINDER AND METHOD OF ADJUSTING IDLE TRAVEL

[75] Inventors: Kurt Saalbach, Walldorf; Willi Hartmann, Riedstadt, both of Fed. Rep. of Germany

[73] Assignee: Alfred Teves GmbH, Frankfurt am Main, Fed. Rep. of Germany

[21] Appl. No.: 810,020

[22] Filed: Dec. 17, 1985

[30] Foreign Application Priority Data

Dec. 17, 1984 [DE] Fed. Rep. of Germany ....... 3446005

[51] Int. Cl.[4] ............................................. B60T 11/28
[52] U.S. Cl. ...................................... 60/589; 60/327; 92/13.7
[58] Field of Search ................. 60/562, 585, 589, 327, 60/547.1; 92/13.7

[56] References Cited

U.S. PATENT DOCUMENTS

| 4,270,355 | 6/1981 | Green | 60/589 |
|---|---|---|---|
| 4,407,121 | 10/1983 | Crumb | 60/589 |
| 4,492,082 | 1/1985 | Belart | 60/589 |
| 4,550,567 | 11/1985 | Schaefer | 60/589 |
| 4,582,365 | 4/1986 | Belart | 60/589 |

FOREIGN PATENT DOCUMENTS 3302484 7/1984 Fed. Rep. of Germany .
3312192 10/1984 Fed. Rep. of Germany .
1405812 10/1986 Fed. Rep. of Germany .

Primary Examiner—Abraham Hershkovitz
Attorney, Agent, or Firm—James B. Raden; Robert P. Seitter

[57] ABSTRACT

A pressure cylinder is disclosed having at least one master cylinder piston, provided with a compensating bore which is in connection with opposite sides of the piston and which is closable by a valve piston movable relative to the master cylinder piston. The valve piston is fastened at the end of an extensible central tension element which projects into the pressure chamber of the pressure cylinder and secures through two spring retainers a piston return spring at the master cylinder piston. In order to reduce the idle travel of the master cylinder, the distance between a stop and an abutment face on a flange of the cylinder is first determined and then added to a predetermined functional distance desired to be maintained between the abutment face and a pressure surface on an actuating piston, so that an assembled dimension is determined. The extensible element is adjusted during assembly to position the pressure surface spaced from the stop equal to the assembled dimension.

1 Claim, 1 Drawing Figure

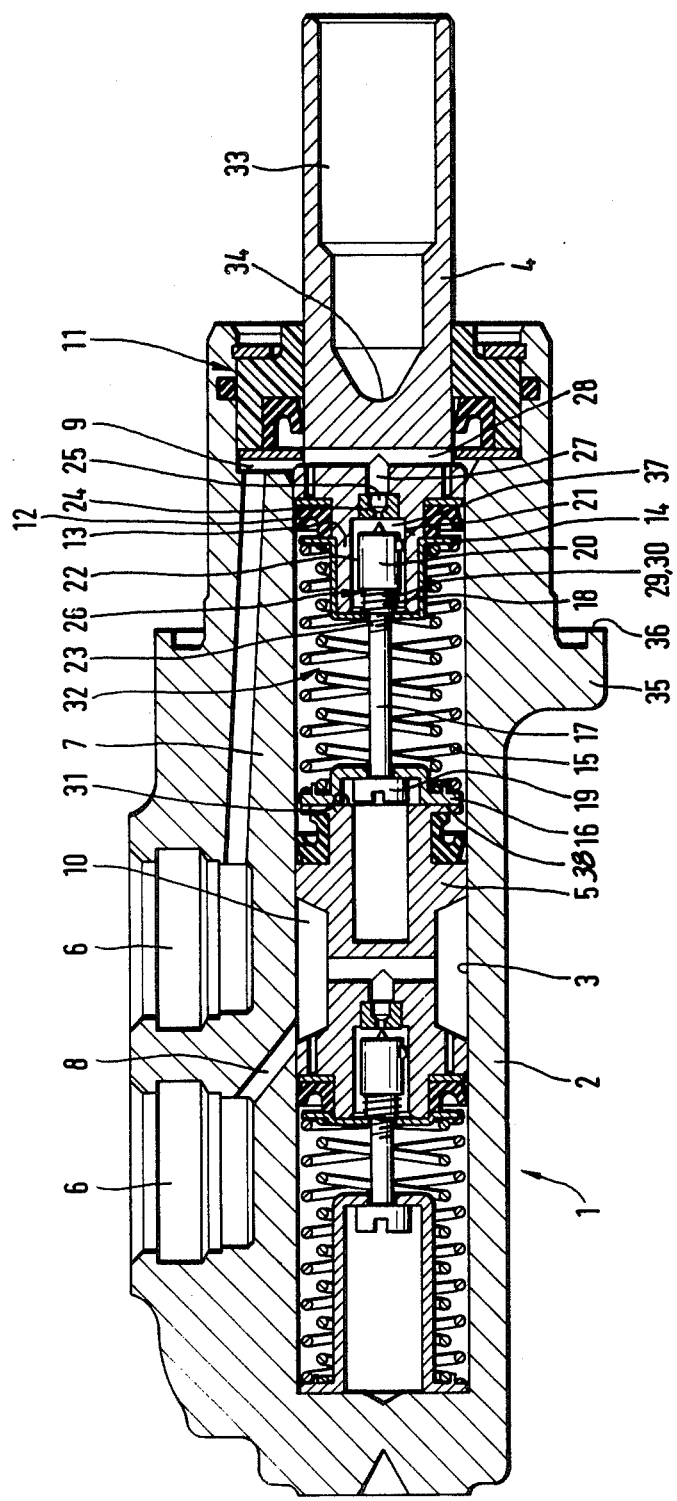

PRESSURE CYLINDER AND METHOD OF ADJUSTING IDLE TRAVEL

BACKGROUND OF THE INVENTION

The invention is related to a pressure cylinder and a method for adjusting the idle travel of a pressure cylinder being used, in particular, in hydraulic actuating systems in automotive vehicles. The invention relates to a pressure cylinder of the general type having an abutment face provided at a flange provided on a cylinder casing and which serves to fasten the pressure cylinder to a wall, and further including a piston positioned in a bore in the cylinder casing, which presents a pressure surface to receive a force applying member. Guided within a bore is a central valve with a tension element pretensioned by a captive spring arrangement. The tension element untensions as the piston moves and, under the effect of a spring arrangement which takes support through a support face provided at a spring retainer and a stop, the central valve interrupts a connection from a pressure chamber on one side of the piston to an intake chamber arranged behind the piston.

A pressure cylinder of this type described is in the German patent application No. (P 34 24 513.8). In order to reduce the idle travel of this pressure cylinder, compensation elements of different thickness are required to be positioned between the piston and the push-rod providing for the adjustment to a rated functional distance. This method, however, leads to increased assembly efforts and additional shims are needed. Also, the necessary thickness of the compensating elements can not be determined in a hydraulically full state of the pressure cylinder. That is, the pressure cylinder must be completely vented before the measuring operation. Only thereafter is it possible by sliding the push-rod piston to check the position at which the central valve closes. Such an adjusting procedure is comparatively complicated and expensive.

Pressure cylinders adjusted by the foregoing method which are filled with hydraulic fluid can not be stored over an extended period of time, since an alteration of the hydraulic fluid, such as, for example, the absorption of water from the air, may take place. This in turn may lead to corrosion damage at the pressure cylinder, jeopardizing later use of the pressure cylinders.

SUMMARY OF THE INVENTION

It is, therefore, the object of the present invention to provide for a pressure cylinder of the general type described and a method by which the idle travel of the cylinder can be adjusted to a minimum with minimum effort, time and equipment.

According to an important feature of the invention, this object is achieved in that the distance between the stop and the abutment face is first determined and added to the predetermined functional distance desired between the abutment face and the pressure surface, so that an adjustment dimension is determined which is then adjusted between the support face at the spring retainer and the pressure surface at the piston in the course of assembly of the piston. Since the position of the force applying member, such as, for example, the push-rod brake pedal, is, as a rule, not adjustable, it often occurs that upon mounting of the pressure cylinder, for example to a splash wall of a vehicle or at a housing of a power booster, either excessive free play occurs between the end of the push-rod and the pressure surface at the piston or the piston may already be pushed into the bore by the push-rod. Either situation is undesirable.

In the former case an increased idle travel will come about which is multiplied on account of the lever ratio at the brake pedal, and a closure of the central valve in the pressure cylinder may occur prematurely in the latter case, as a result whereof a residual pressure may build up in the pressure chamber, for example under the effect of temperature, while the pressure cylinder is in the initial at rest position. Although the latter case can be prevented such as by sizing the axial dimensions of the pressure cylinder in such a manner that the push-rod will be just in abutment with the pressure surface of the piston in the most unfavorable instance, an even greater degree of idle travel will result at the pedal.

These disadvantages are avoided by the method of the present invention. A very important result of the inventive method provides for identical idle travels between different pressure cylinders manufactured in conformity with this method. The idle travel of the pressure cylinder will then no longer be determined but by the closing travel of the central valve which is defined by its design, but rather, is always constant. Owing to the adjusting method according to the present invention, highly narrow-tolerance production measurements which often carry higher tooling costs can be avoided for the components of the pressure cylinder.

Another important feature provides that the central valve is furnished with a valve piston whose valve play is determined by a chamber laterally defined by the piston. The valve piston is coupled, through a length adjusting device, to the tension element in a positive locking configuration. This structure provides that in the initial position of the pressure cylinder, the valve piston is retained, by the tension element, in abutment against a stop within the chamber, which stop is positioned opposite the valve seat, thereby assuring that the central valve is always open in the initial position of the pressure cylinder. Accordingly, the distance between that end of the captive spring arrangement which is positioned opposite the piston, on one hand, and the piston, on the other hand, can be reduced or extended without having any bearing on the closing travel of the central valve.

A further important feature of the invention provides for a particularly easy and rapid adjustment of the length adjusting device providing a threaded connection between the tension element and the valve body. It is advantageous in this context that the threaded connection is securable against rotation on adjustment. This is achieved due to the captive spring arrangement, and the locking which comes about in the threaded engagement.

Advantageously, the adjusting method is particularly suited for a tandem master cylinder having a first and a second piston in sequential arrangement within the bore, with the second piston resiliently preloaded in the direction of the first piston and constituting the stop for the captive spring arrangement of the first piston. The method of the invention can also be carried out in slave cylinders of the type having a central valve of the forementioned kind and the captive spring arrangement described above.

BRIEF DESCRIPTION OF THE DRAWING

The invention will be better understood after a reading of the following detailed description in conjunction with the drawing in which there is shown a tandem master cylinder shown in a longitudinal section showing details of construction.

DETAILED DESCRIPTION OF THE PREFERRED EMBODIMENT

A tandem master cylinder 1 includes a cylinder casing 2 including a cylinder bore 3 within which a master cylinder piston 4 and an intermediate piston 5 are sealingly slidably guided. From a supply tank 6, which is outlined only in the drawing, intake ducts 7, 8 each connect with respective chambers 9, 10 positioned respectively behind the master cylinder piston 4, and the intermediate piston 5. The chamber 9 located behind the master cylinder piston 4 is sealed off from the atmosphere, that is, from the right as viewed in the drawing, by a sealing arrangement 11.

The design of the intermediate piston 5 with its pertaining components is identical with that of the master cylinder piston 4, therefore only the master cylinder piston 4 will be described in the following.

The master cylinder piston 4 includes a primary cup 12 as a piston seal which surrounds a cylindrical section 13 of the master cylinder piston 4 projecting on the front side of the latter. At the cylindrical section 13, a spring retainer 14 of a piston return spring 15, designed as a compression spring takes support and which is abutted against a spring retainer 16 at its other end. The piston return spring 15 is secured by a rod-shaped central tension element 17 which penetrates axially, movably through the spring retainers 14, 16 and is abutted against the outside of each of the spring retainers 14, 16 with heads 18, respectively.

The one head 18 of the tension element 17 is coupled to a valve piston 20 which projects into a central bore 21 on the front side of the master cylinder piston 4 and is guided therein. The valve piston 20 forms free lateral inlet ducts 22. Jointly with the spring retainer 14, the central bore forms the chamber 37. The tension element 17 is screwed, through a thread 23, into a central threaded bore, not shown, of the valve piston 20. A central seal 24 provided with a central bore 25 is fixed at the front side of the central bore 21 located opposite to the valve piston 20. The valve piston 20 is positioned at a slight distance from the seal 24. This distance constitutes the valve play of the central valve 26.

In the master cylinder piston 4, the bore 25 is preceded to the right, as viewed in the drawing, by a central compensating bore 27 which is in connection, through a duct 28 extending in transverse direction in the master cylinder piston 4, with the chamber 9 which is positioned behind the master cylinder piston 4 and is thereby connected with the intake bore 7. The outside diameter of the seal 24 is larger than the diameter of the compensating bore 27. A compression spring 30 serving as a valve closing spring 29 is arranged between the valve piston 20 and the spring retainer 14 on the side of the master cylinder piston 4.

The master cylinder piston 4 is shown in its released position in the drawing. In this position, the spring retainer 16 is abutted, with its support face 38, against the stop 31 provided at the intermediate piston 5 and facing the master cylinder piston 4 in such a manner that the tension element 17 is in tension, which maintains the valve piston 20 resiliently abutted against the front face of the spring retainer 14. The front face facing the master cylinder piston 4 forms the lefthand stop 31 as viewed in the drawing and is intended for supporting the end of the captive spring arrangement 32 of the master cylinder piston 4.

In the drawing, the right end of the master cylinder piston 4 includes a blind-end bore 33 whose closed end constitutes the pressure surface 34 for a push-rod not shown in the drawing. The push-rod is coupled, for example, to a hydraulic or vacuum-operated power booster or directly by way of a rod-type means, to a brake pedal in well known manner which also is not shown in the drawing.

The cylinder casing 2 is provided with a flange 35 having a front-side abutment face 36 which serves as a means of abutment against a splash wall of an automotive vehicle or with a housing of a power booster. The flange 35 and, thereby, the tandem master cylinder 1 are fixed, by means of fixation screws, not shown in the drawing, to a stationary splash wall or to a housing.

The method of adjustment of the inventive tandem master cylinder 1 is carried out as follows:

Upon mounting of the complete intermediate piston 5 in the cylinder bore 3 of the tandem master cylinder 1 and taking care that the spring retainer of the intermediate piston 5 is in abutment against the closed end of the cylinder bore 3, the distance between the stop 31 and the abutment face 36 is determined. This distance is added to the very narrow-tolerance predetermined functional distance desired to be maintained between the abutment face 36 and the pressure surface 34 so as to give an installed dimension to which the position of the piston is adjusted during assembly. In the course of assembly of the piston to form a complete piston comprising the components 4, 20, 17, 16, 15, 14, 12, 24, the tension element 17 is adjusted in such a manner that the installed distance between the support face 38 at the spring retainer 16 and the pressure surface 34 at the piston 4 is achieved. Subsequently, the tension element 17 and the valve body 20 are secured against rotation, for example by applying shellac.

Thereafter, the complete master cylinder piston 4 is introduced into the cylinder bore 3 and shifted therein until the spring retainer 16 comes to be abutted against the intermediate piston 5. The functional distance between the pressure surface 34 and the abutment face 36 will then correspond to the predetermined functional distance. The functional distance of a production series of identical-type master cylinders often varies as a result of different distances between the end of a push-rod and the front face of a wall to which the particular master cylinder is to be flanged. Thanks to the inventive method, identical-type master cylinders can be used without modification of their components parts, the master cylinders requiring no modification to conform to the predetermined adjustment.

If the tandem master cylinder 1 according to the invention is, for example, flanged to a housing of a vacuum brake power booster, the end of the push-rod, not shown in the drawing, will come to be just abutted against pressure surface 34. Minimum free idle travel of the tandem master cylinder 1 will be achieved.

What is claimed is:

1. A method of adjusting the idle travel of a pressure cylinder used in a hydraulic actuating system of an automotive vehicle, of the type including an abutment face on a flanged provided on a cylinder casing and serving to fasten the pressure cylinder to a wall, a piston in a bore in the cylinder casing, said piston presenting a pressure surface to receive a force applying member and guiding within the bore a central valve with a length adjustable tension element pretensioned by a captive spring arrangement, said tension element adapted to untension upon slidable movement of said piston, said spring arrangement taking support through a support face provided at a spring retainer on a stop, said central valve thereupon interrupting a connection from a pressure chamber on one side of said piston to an intake chamber arranged on another side of said piston, comprising the steps: measuring the distance between said stop and the abutment face; and adjusting the length of the tension element to space the support face from the pressure surface an amount corresponding to the sum of the measured distance and a predetermined functional distance desired between said abutment face and said pressure surface.

* * * * *